US012259119B2

(12) United States Patent
Matuschek et al.

(10) Patent No.: US 12,259,119 B2
(45) Date of Patent: Mar. 25, 2025

(54) INFLATABLE LIGHTING BODY

(71) Applicant: caligri GmbH, Bonn (DE)

(72) Inventors: Michael Matuschek, Bonn (DE); Luca Oltenau, Bonn (DE)

(73) Assignee: caligri GmbH, Bonn (DE)

( * ) Notice: Subject to any disclaimer, the term of this patent is extended or adjusted under 35 U.S.C. 154(b) by 0 days.

(21) Appl. No.: 18/259,655

(22) PCT Filed: Dec. 13, 2021

(86) PCT No.: PCT/EP2021/085510
§ 371 (c)(1),
(2) Date: Jun. 20, 2024

(87) PCT Pub. No.: WO2022/144168
PCT Pub. Date: Jul. 7, 2022

(65) Prior Publication Data

US 2024/0401769 A1 Dec. 5, 2024

(30) Foreign Application Priority Data

Jan. 4, 2021 (DE) ........................ 202021100006.6

(51) Int. Cl.
*F21V 3/02* (2006.01)
*F21V 17/04* (2006.01)
(Continued)

(52) U.S. Cl.
CPC .............. *F21V 3/026* (2013.01); *F21V 17/04* (2013.01); *F21V 17/10* (2013.01);
(Continued)

(58) Field of Classification Search
CPC ......... F21V 3/026; F21V 17/04; F21V 17/108
See application file for complete search history.

(56) References Cited

U.S. PATENT DOCUMENTS 8,313,203 B1 11/2012 Guiney

FOREIGN PATENT DOCUMENTS

CN 210514896 U 5/2020
DE 2901695 A1 7/1979
(Continued)

OTHER PUBLICATIONS

International Search Report and Written Opinion for PCT Application No. PCT/EP2021/085510 mail date Mar. 21, 2022, 17 pages.
(Continued)

*Primary Examiner* — Karabi Guharay
(74) *Attorney, Agent, or Firm* — Maine Cernota & Curran

(57) ABSTRACT

The invention relates to an inflatable lighting body comprising an inflatable gas-tight inner sleeve, an outer sleeve which is translucent at least in some regions and which surrounds the inner sleeve, means for attaching at least one lighting means to the lighting body in such a manner that the lighting means emits light into the interior of the lighting body and dispenses light outwards as diffused light via translucent regions of the outer sleeve, and optionally securing means for mounting the lighting body, wherein a lighting tube or a lighting panel can be attached to the inflatable lighting body as the lighting means, and the means for attaching the lighting means are designed such that lighting means or luminaires of different shapes and sizes can be selectively attached to the lighting body. According to the invention, the means for attaching the lighting means to the lighting body comprise one or more strips which surround the lighting means or the luminaire in the secured state thereof. The lighting body according to the invention has a flexible application and can be used in a versatile manner, and the user is not limited to using the lighting means provided by the manufacturer of the lighting body when selecting the lighting means.

12 Claims, 5 Drawing Sheets

(51) Int. Cl.
*F21V 17/10* (2006.01)
*F21Y 103/10* (2016.01)
*F21Y 105/00* (2016.01)
*F21Y 115/10* (2016.01)

(52) U.S. Cl.
CPC ....... *F21Y 2103/10* (2016.08); *F21Y 2105/00* (2013.01); *F21Y 2115/10* (2016.08)

(56) References Cited

FOREIGN PATENT DOCUMENTS

| | | | | | |
|---|---|---|---|---|---|
| DE | 102016003852 | A1 | | 9/2017 | |
| DE | 202020102362 | U1 | | 5/2020 | |
| FR | 2995655 | A1 | | 3/2014 | |
| WO | WO-2017162785 | A1 | * | 9/2017 | ................ F21V 1/06 |

OTHER PUBLICATIONS

"Bag o Light Air 2000 with power supply PS50 II. Functional description (Rev.: 1.05)" Internet Citation. Apr. 20, 2007 (Apr. 20, 2007), p. 22pp, XP007912948 retrieved from the Internet: URL https://www.licht-technik.com/download/BOL/Bagolight.pdf [retrieved on May 5, 2010].

International Preliminary Report on Patentability for International Application No. PCT/EP2021/085510 mail date Jul. 13, 2023, 15 pages.

* cited by examiner

INFLATABLE LIGHTING BODY

RELATED APPLICATIONS

This application is a national phase application filed under 35 USC § 371 of PCT Application No. PCT/EP2021/085510 with an international filing date of Dec. 13, 2021, which claims priority of German Patent Application 20 2021 100 006.6 filed Jan. 4, 2021. Both of these applications are incorporated by reference in their entirety for all purposes.

FIELD OF THE INVENTION

The present invention relates to an inflatable lighting body, comprising an inflatable gas-tight inner sleeve, and an outer sleeve, which is translucent at least in some regions, and which surrounds the inner sleeve, means for the attachment of at least one lighting means to the lighting body such that the lighting means irradiates light into the interior of the lighting body and the light is emitted into the environment as a diffuse light via translucent regions of the outer sleeve, and, if appropriate, attachment means for the mounting of the lighting body, wherein it is possible to attach a lighting tube or lighting panel to the inflatable lighting body as a lighting means, and wherein the means for the attachment of the lighting means are designed such that either lighting means or lighting units of different shapes and sizes can be attached to the lighting body.

BACKGROUND OF THE INVENTION

From DE 10 2016 003 852 A1 an inflatable lighting body is of known art, in which the lighting means is a carrier strip with light-emitting diodes, which is inserted into a pocket of the outer sleeve. In this lighting body of known art, the lighting means is thus already integrated into the lighting body. This is disadvantageous, on the one hand because, for the purchaser of such a lighting body, the type, size, and shape of the lighting means are already predetermined. The purchaser must therefore use the lighting means accommodated in the lighting body, in this case a planar LED strip. Other lighting means, in particular those that the user already has in stock, or those that he can purchase on the market, because he considers a certain lighting means to be suitable for a certain lighting requirement, are thus not eligible for use in conjunction with the inflatable lighting body. It is impossible to use them, because the size or shape of the lighting means does not fit into the pocket provided on the lighting body.

SUMMARY OF THE INVENTION

This is where the present invention comes in. The object of the invention is to provide an inflatable lighting body with the features of the type referred to above, which is more versatile, and allows a greater degree of freedom with respect to the use of the lighting means, via which the light is irradiated into the interior of the lighting body.

This object is achieved by an inflatable lighting body of the type referred to above, with the features of Claim 1.

In accordance with the invention it is envisaged that the means for the attachment of the lighting means to the lighting body comprise one or a plurality of straps which, in the attached state of the lighting means or the lighting unit, overlap the latter.

The invention thus takes a different approach to a solution than that of the prior art referred to above. The lighting body in accordance with the invention can be made available to the user without a lighting means, so that the user is not dependent on a specific predetermined lighting means. Instead, after purchase, the user can combine a wide variety of lighting means or, if appropriate, a lighting unit, with the inflatable lighting body. The lighting body itself just has the means for the attachment of a wide variety of lighting means, but does not itself have to feature a lighting means. Thus, a lighting body in accordance with the invention is much more flexible and versatile in its application. In the selection of the lighting means, the user is not limited to using the lighting means provided by the manufacturer of the lighting body.

The purpose of the lighting body in accordance with the invention is to, create a diffuse, soft light from the more or less directional light irradiated by a lighting means or lighting unit, for example the linear irradiation of a lighting tube, or the irradiation of a lighting unit in a narrow surface region. There are different fields of application in which such a diffuse light is required, in particular, requirements for such lighting exist in the film and photographic sector. Here, while high-quality lighting means or lighting units are on offer, they are not suitable for light emission, with too high a light density per unit surface for most applications. The lighting body in accordance with the invention makes it possible to convert the light of the lighting means into a soft, diffuse light in a relatively simple manner, and at a reasonable cost. In this context, it is particularly advantageous that the application of the lighting body in accordance with the invention is not limited to a specific type of lighting means or lighting unit that generates the primary light, but instead the lighting body does not make any demands in terms of the lighting means, and can therefore be used very flexibly. The object of the lighting body in accordance with the invention is therefore not to generate light, but to convert the light into a soft, diffuse light.

In accordance with a further development of the invention, the means for the attachment of the lighting means are, in particular, designed such that they are suitable for the attachment of, for example, either a cylindrical or a planar plate-form lighting means, or also a lighting unit with a planar lower face, to the lighting body.

In accordance with a preferred further development of the invention, the outer sleeve is open at the top over a substantial part of its length, and has a longitudinal slot, wherein the lighting means can either be inserted into the outer sleeve from above in the region of the longitudinal slot, or can be positioned on the outer sleeve above the longitudinal slot, and/or can be externally positioned on the inner sleeve in the region of the longitudinal slot. If, for example, the lighting means is approximately tubular, and can be inserted through the slot into the outer sleeve from above, then the light from the lighting means is irradiated into the interior of the outer sleeve, and then re-emerges from the lower translucent region as a diffuse light from the outer sleeve into the environment. If the lighting unit takes the form of a planar lighting unit, or at least a lighting unit with a planar lower face, or a plate-form, panel-type lighting means, it can be positioned on the inflatable lighting body such that the light is irradiated through the slot into the interior of the outer sleeve of the lighting body. The planar lighting unit then preferably sits in the longitudinal slot of the outer sleeve, and sits with its lower face on the inner sleeve of the lighting body.

In accordance with a preferred further development of the invention, a lighting tube can be used as the lighting means, in particular an LED lighting tube, Such LED lighting tubes, as a general rule cylindrical, are available on the market in various embodiments, and have a comparatively high light flux and high lighting intensities, and are also available with battery-mode operation. They can contain LEDs of different light colours, and a unit to control the light colour, and have comparatively low operating temperatures, so that they can easily be arranged in the immediate vicinity of an outer sleeve of the inflatable lighting body, if the latter is made from a textile material with plastic fibre components.

In accordance with the present invention, the means for the attachment of the lighting means to the lighting body comprise one or a plurality of straps, which, in the attached state of the lighting means or the planar lighting unit, overlap the latter. The user of the inflatable lighting body thus positions the lighting means or lighting unit on the lighting body in the upper region where the slot is located, and then places the attachment straps over the lighting means or lighting unit, so as to connect the latter to the lighting body in a releasable manner, Here, one or a plurality of straps are preferably designed as a tensioning device, the tensioning length of which, overlapping the lighting means or the planar lighting unit, can be adjusted in a variable manner. In this manner, the means for attachment are very variable with regard to the circumference of the lighting means or lighting unit to be attached, and can be adjusted in their length such that they overlap the lighting means on the one hand, and on the other hand attach the latter fixedly to the lighting body by tensioning of the straps. The user preferably acquires just the inflatable lighting body, which does not have to have any lighting means, and can then, in a few simple steps, attach a lighting means or a lighting unit of different size and with specific photometric properties, which has been purchased on the market, to the lighting body, and can exchange it at any time for lighting means of different dimensions and/or shapes, with, if appropriate, other desired lighting properties.

One or a plurality of straps in the form of buckle straps, elastic straps, Velcro tapes or the like, are particularly suitable as means for the attachment of the lighting means or lighting unit to the inflatable lighting body. If, for example, Velcro tapes are used, these can in each case be a pair of Velcro tapes that are firmly attached at one end to the outer sleeve of the lighting body, are positioned over the lighting means or lighting unit in a tensioned state, and are then adhesively joined together at their loose ends by means of the Velcro material, with the overlap corresponding to the tensioned state. Buckle straps or belts can also be positioned over the lighting means or lighting unit, tensioned and fixed in the tensioned state in a manner known per se. Alternatively, individual Velcro tapes, extending in a direction transverse to the longitudinal slot, can preferably be provided in a plurality of regions; each of these can be adhesively attached at both ends to a corresponding Velcro tape located on the outer sleeve.

After the attachment of the lighting means or lighting unit in the space, in accordance with a further development of the invention, the mounting of the lighting body itself, that is to say, for example, its suspension from a ceiling, or mounting on a wall, can preferably be carried out via one or a plurality of attachment means, which are attached to the lighting body. In other words, such means for mounting need not be present on the lighting body itself. Instead, the user can purchase a lighting means or lighting unit, which serves as the light source for the lighting body, and on which the attachment means for mounting the assembly are already present. It is often in fact the case that the lighting means or lighting unit is itself already equipped with such attachment means. These can be used for the suspension of the lighting body, because the assembly of lighting body and lighting means has hardly any greater weight than the lighting means by itself, since the lighting body has only a little weight. The latter essentially just consists of the outer sleeve and the inner sleeve, which are inflated with air.

For example, lighting tubes can have threads on the end faces, into which ring eyelets can be screwed, which serve as a mounting for the lighting body. Or it is possible, for example, to push clamps over a lighting tube, to name just two examples.

In accordance with a preferred further development of the invention, the outer sleeve consists of two interconnected regions, each made from a textile material, wherein the region forming the upper section of the sleeve is designed to be dark on its outer surface and reflective on its inner surface, while the region forming the lower section of the sleeve is designed to be translucent. On the one hand, the dark upper region of the outer sleeve does not allow any light to penetrate to the environment, but in addition, the outer sleeve in the upper region is reflective on its inner surface, so that the light irradiated by the lighting means into the interior of the outer sleeve is there reflected onto the lower inner region of the outer sleeve, and is thereby intensified, resulting in an increased light emission via the lower translucent region of the lighting body.

One advantage, amongst others, of using an air-tight transparent inner sleeve, around which is positioned an additional separate outer sleeve, which can be made, for example, from a textile material (fabric), is the fact that an additional light scattering effect can be achieved via the outer sleeve, which is woven, for example. The use of special fabrics and, if appropriate, coatings on these fabrics, makes it possible to convert a “hard” light into a “soft” (diffuse) light, so that the light source is no longer visible. Uniformly illuminated coverings are very important in the film and photographic industry and cannot always be achieved with the technical means of known art. If there is a choice between air-tight plastic materials and textiles, it is better to use the latter (fabrics), The use of an outer sleeve that is separate from the inner sleeve has the further advantage that in the event of damage, a simple and inexpensive replacement is possible. In the event of visible damage when using only one air-tight plastic sleeve, as is sometimes the case in the prior art, this often leads to total loss. A uniformly luminous light surface, as is obtained with the solution in accordance with the invention, can be used for reflections and mirroring, for example, in car advertising shoots, or product photographs. Here, textile materials (fabrics) for the outer sleeve are also advantageous because they have finer seams than those of welded plastic materials.

BRIEF DESCRIPTION OF THE DRAWINGS

In what follows, the present invention is explained in more detail by means of examples of embodiment, with reference to the accompanying figures. Here.

DETAILED DESCRIPTION

Figure 1:
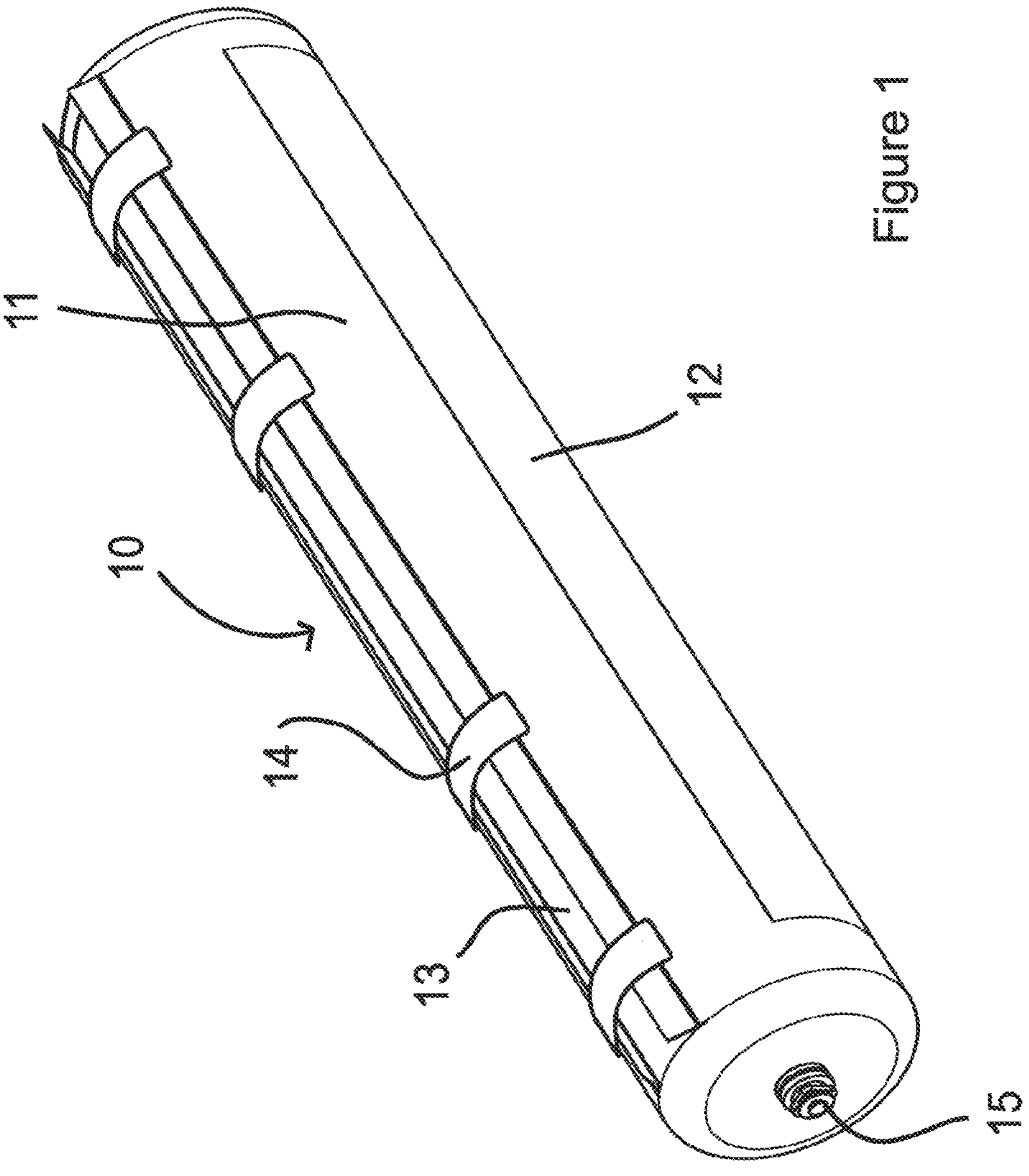
FIG. 1 shows a view in perspective of an example of an inventive lighting body in accordance with one embodiment variant of the present invention.

In what follows, reference is first made to FIG. 1, and a possible embodiment variant of the present invention is explained in more detail on the basis of the latter. The perspective representation in FIG. 1 shows the inventive lighting body 10 in the inflated state, in which it assumes, for example, an elongated cylindrical basic shape. In the assembled state of use, the lighting body 10 comprises an upper region with an opaque region 11 of the outer sleeve, and a lower region 12 in which the outer sleeve is translucent, so that in the latter region a diffuse light can be irradiated downwards into a region of the room to be illuminated. Within the outer sleeve is located an inflatable inner sleeve made from a substantially gas-tight material, so that the lighting body 10 can be inflated, A valve 15 is arranged, for example, on the end face of the cylindrical lighting body 10 for purposes of filling the latter with air. The outer sleeve consisting of the two above-mentioned regions 11 and 12 surrounds the inflatable inner sleeve almost completely when in use, except for an upper region, in which there is a longitudinal slot 13 that can extend over the entire length of the outer sleeve, so that the outer sleeve is open at the top in the region of this longitudinal slot 13, and in this region an adjustment in diameter is possible, whereby differently dimensioned lighting means or lighting units can be accommodated in the upper region of the outer sleeve, as will be explained in more detail below.

In order to attach a lighting means to the lighting body 10, straps 14 are provided as a tensioning device in the region of the longitudinal slot 13 on each of the two sides of the outer sleeve; these are, for example, Velcro tapes, or the like. The said straps 14, which stretch across the longitudinal slot from the two sides, can be attached to the outer sleeve 11, or to each other, for example, in a tensioned state corresponding to a predetermined width of the longitudinal slot 13, and in this manner the lighting means can be attached to the lighting body 10. The straps 14 are then stretched across the lighting means in the attachment position, and are fixed to the outer sleeve, or to each other. In the first variant mentioned, for example, the outer sleeve can have strips of Velcro tape (for example, Velcro fleece) to which the straps 14 (for example, Velcro tapes) are attached. The strips of Velcro tape can, for example, extend along the outer sleeve in a longitudinal direction, and the straps 14 then extend in a direction transverse to this longitudinal direction, whereby as a general rule a plurality of straps 14 (Velcro tapes) are provided, in each case spaced apart from one another.

The light emitted by the lighting means is irradiated into the interior of the lighting body 10, so that it can be diffusely emitted into the environment via the lower translucent region 12 of the outer sleeve. The upper, opaque region 11 of the outer sleeve can be designed to be reflective on its inner surface, so that the light is directed towards the translucent region 12 by reflection in the interior of the lighting body, thereby increasing the luminous efficiency of the light irradiated in the translucent region 12. For this reflective design, one can, for example, coat the inner surface of the outer sleeve in the opaque region 11 with a reflective material.

Figure 2:
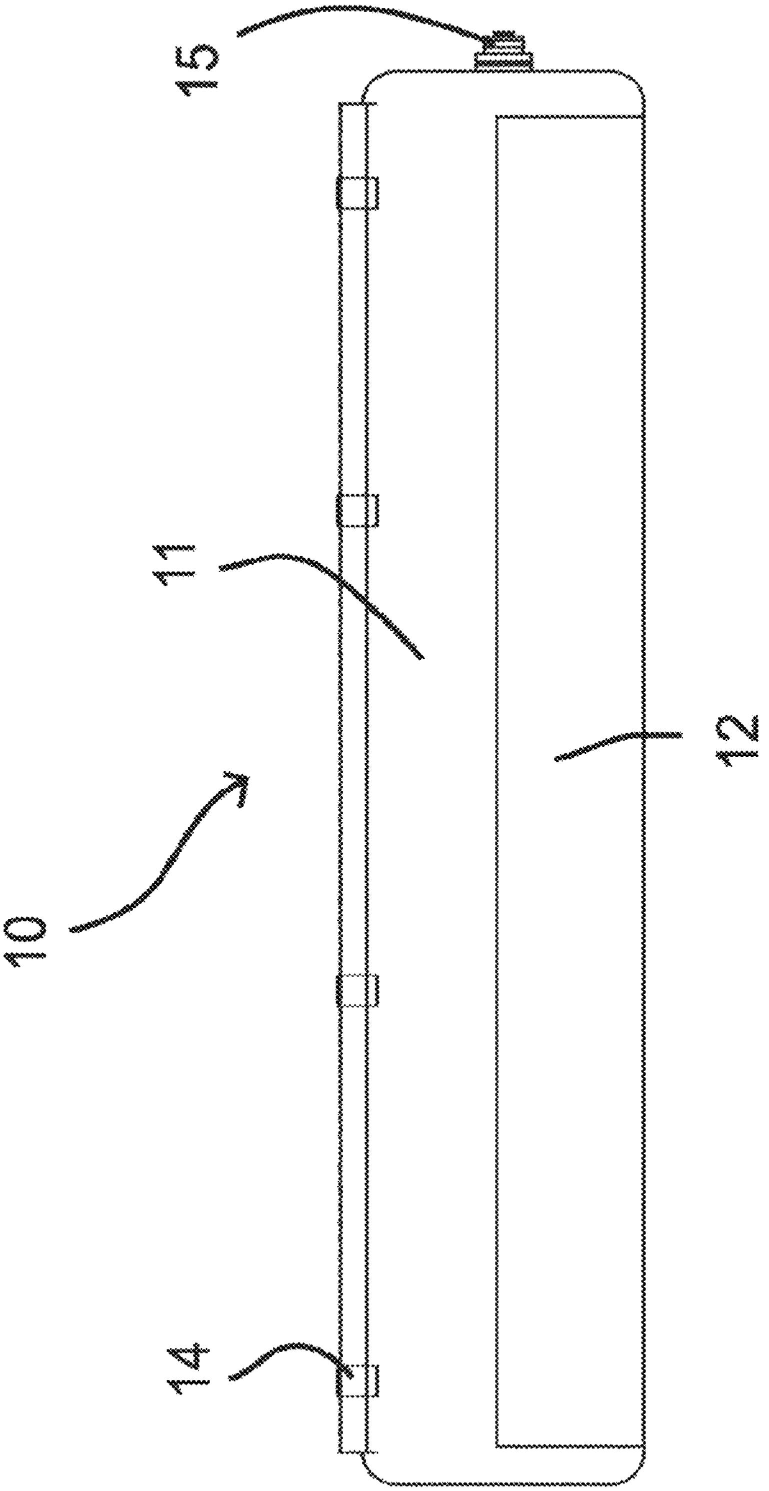
FIG. 2 shows a schematically simplified side view of an example of an inventive lighting body in accordance with the present invention.
Figure 3:
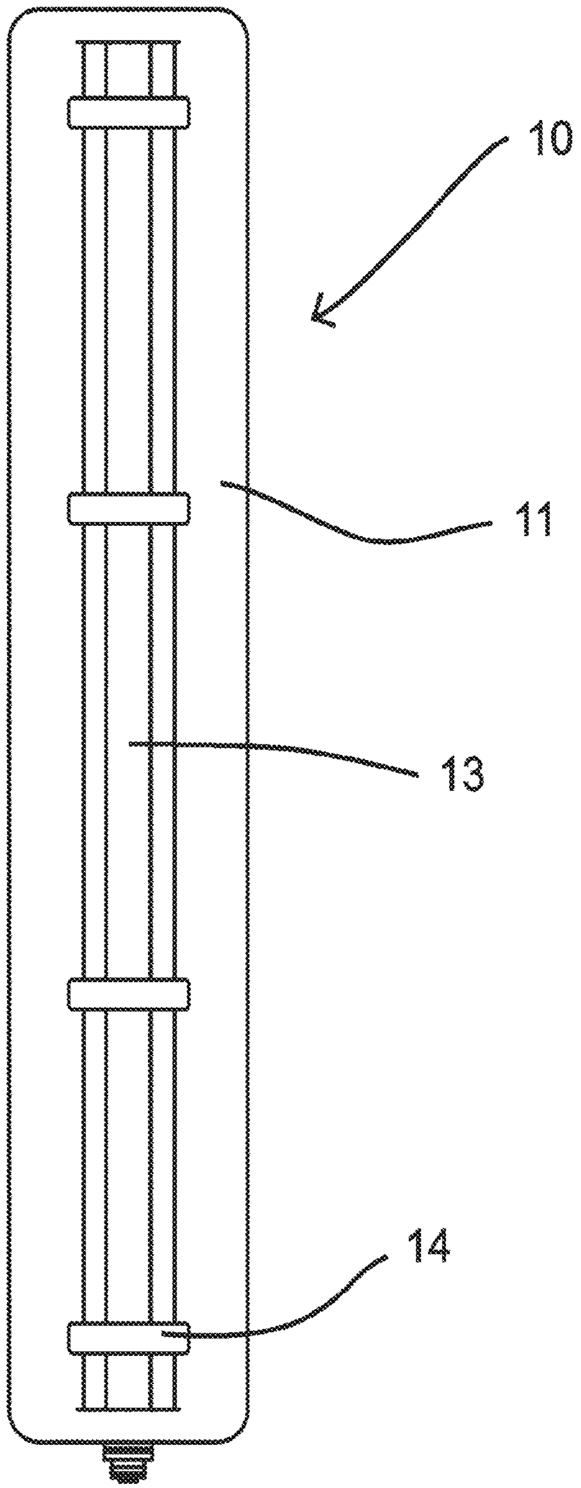
FIG. 3 shows a plan view onto an inventive lighting body as shown in FIG. 2.

FIG. 2 shows a side view of a lighting body 10, and the plan view onto the lighting body 10 is shown in FIG. 3. Here, one can see the upper longitudinal slot 13, which extends, for example, over a fraction of the circumference of the cylindrical outer sleeve of the lighting body 10, and which also extends over most of the length of the lighting body in the upper region, approximately centrally, whereby the upper longitudinal slot 13 can end in each case at some distance from the end face of the cylindrical lighting body 10, It can also be seen in FIG. 3 that straps 14 extend from the outer sleeve on each side of the longitudinal slot 13, stretch across the longitudinal slot, and can be connected in a suitable manner either to the outer sleeve on each side, or to each other. The slot width of the longitudinal slot can be variably altered by these tensible straps 14, so that lighting means of different sizes can be arranged in the region of the longitudinal slot 13, and attached to the lighting body 10 by means of the straps 14.

Figure 4:
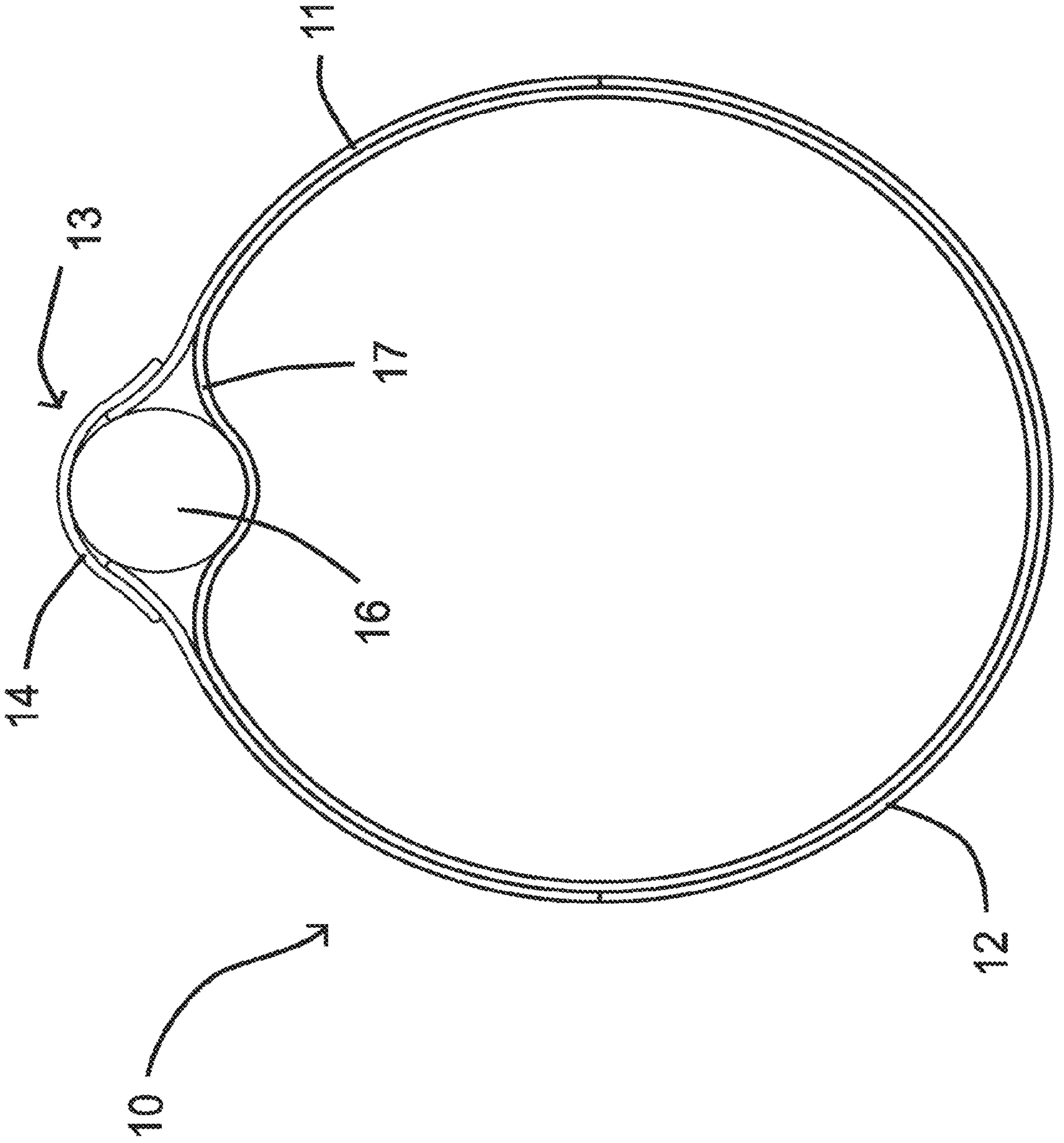
FIG. 4 shows a cross-section through an inventive lighting body, with a lighting tube attached to the latter as the lighting means.
Figure 5:
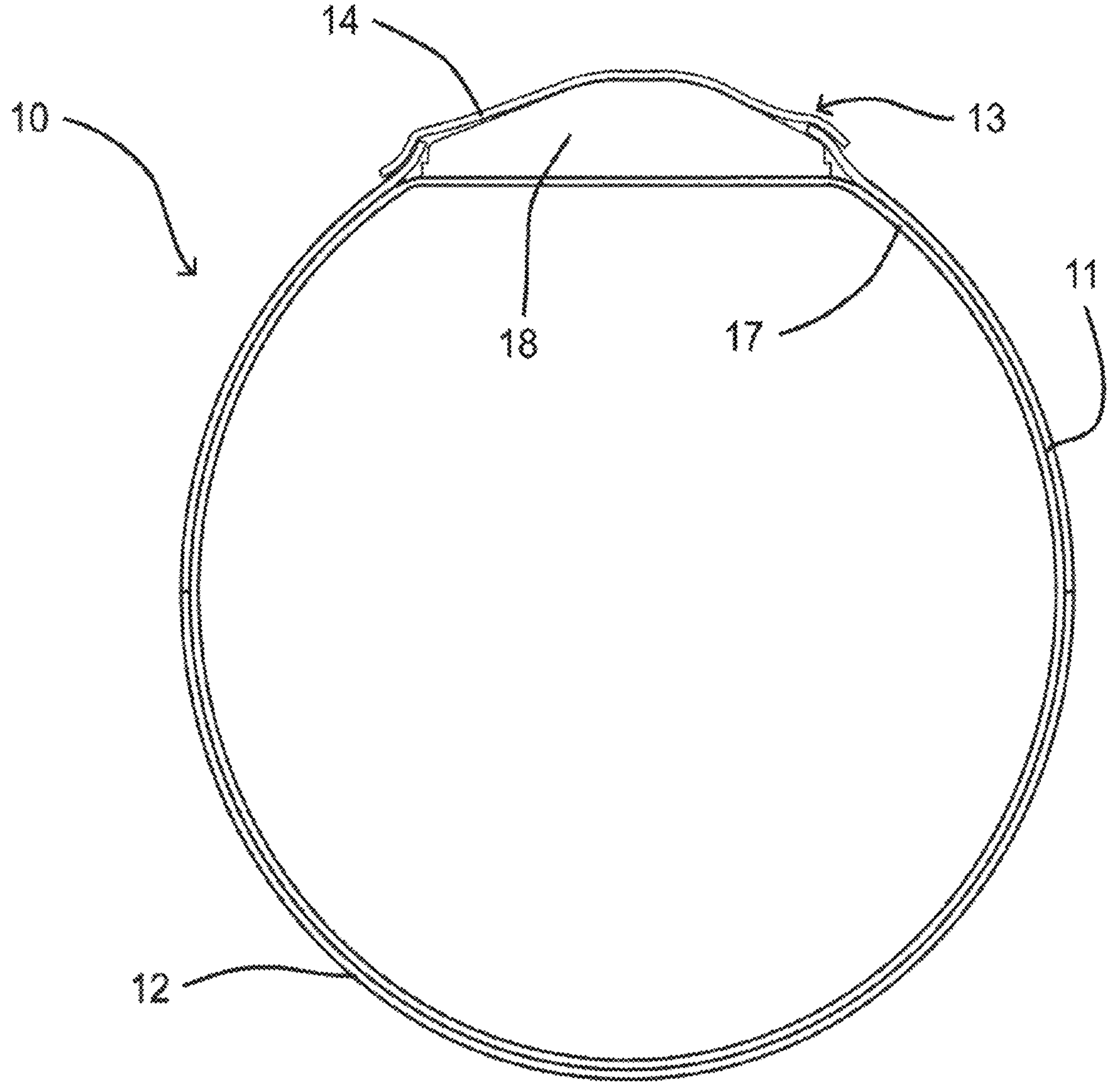
FIG. 5 shows a cross-section through an inventive lighting body, with a planar LED panel attached to the latter as a lighting unit.

In what follows, reference is made to FIGS. 4 and 5 and on the basis of these, the attachment of lighting means and lighting units of different shapes and sizes to the lighting body 10 is explained in more detail. FIG. 4 shows a variant in which a cylindrical LED lighting tube 16 is attached to the lighting body 10 in the region of the longitudinal slot 13. In FIG. 4, the lighting body 10 is shown in cross-section and it can be seen that an inner sleeve 17 is accommodated in the outer sleeve 11, 12, which consists of an inflatable plastic, and in the view shown in FIG. 4 is inflated. In this state, the inner sleeve 17 lies against the inside of the outer sleeve. It can also be seen in FIG. 4 that the upper region 11 of the outer sleeve is opaque, while the lower region 12 of the outer sleeve is translucent, allowing light to be irradiated into the environment. In the example, the upper region 11 of the outer sleeve extends over approximately the upper half of the circumference, and the lower region 12 of the outer sleeve extends over approximately the lower half of the circumference, although these proportions can be varied over a wide range, depending on requirements.

The LED lighting tube attached to the lighting body 10 in the representation shown in FIG. 4 can be a commercially available lighting means, which is held at the top between the inflated inner sleeve 17 and the straps 14 attached to the outer sleeve 11. It can be seen that there are two such straps 14*a*, 14*b*, one extending from the left-hand side, and the other extending from the right-hand side, of the outer sleeve, where the latter has the upper longitudinal slot 13. If, for example, there are two corresponding Velcro tapes 14*a*, 14*b*, these can then be positioned overlapping each other above the LED lighting tube 16, so that the corresponding surfaces of the Velcro tapes 14*a*, 14*b* adhere to each other; a taut positioning of the Velcro tapes 14*a*, 14*b* results, and the LED lighting tube 16, which in the example is cylindrical, and thus round in diameter, is effectively clamped between the Velcro tapes 14*a*, 14*b* and the inner sleeve 17. Alternatively, only one Velcro tape can be provided at each attachment point, which tape is connected at each of its two end regions to a Velcro strip that extends along both sides of the longitudinal slot 13 on the outer sleeve, so that here the slot width can also be variably adjusted depending on the attachment positioning of the Velcro tape extending in the transverse direction.

The inflated inner sleeve 17 is flexible to a certain extent, as indicated in the figure, so that it is somewhat depressed in the upper region, where it serves as an abutment for the LED lighting tube 16. By virtue of this property of the inner sleeve 17 and the use of a tensioning device with, for example, Velcro tapes 14*a*, 14*b* as in FIG. 4, which can overlap to different extents, lighting tubes or other lighting means with different shapes and diameters can in this manner be attached to the lighting body 10 in the region of the longitudinal slot 13.

FIG. 5 shows a further cross-section through an inventive lighting body 10, in accordance with a further variant in which, instead of an LED tube, an LED panel 18, which is planar on its lower face, is attached to the lighting body 10. The LED panel 18 is not only shaped differently in cross-section from the cylindrical LED lighting tube 16, but it is also wider than the latter, Because the inflated inner sleeve 17 is deformable, it conforms to the shape of the planar lower face of the LED panel 18. Unlike the variant described above with reference to FIG. 4, this can be a complete lighting unit with all typical functions, that is to say, not just a lighting means. The light emitted from the lower face of the LED panel is irradiated downwards through the outer sleeve, which is translucent in the upper region 12, and into its interior. The inner sleeve 17 should, of course, also be made from a transparent material. In the variant shown in FIG. 5, the light is then also diffusely irradiated into the environment through the lower translucent region 12 of the outer sleeve. By virtue of using the inventive lighting body 10, the achievement of this variant is that the light originally emerging downwards from the LED panel is converted into a softer, diffuse light, which is irradiated by the lighting body 10 in accordance with the shape of the translucent region 12 of the outer sleeve, for example over a semi-circular perimeter. This softer, diffuse light is particularly required for lighting applications in the photographic and film sectors.

LIST OF REFERENCE SYMBOLS

10 Lighting body
11 Opaque region of the outer sleeve
12 Translucent region of the outer sleeve
13 Upper longitudinal slot
14 Straps as a tensioning device
14*a* Velcro tape
15 Valve for purposes of inflation
16 LED lighting tube
17 Inner sleeve
18 LED lighting panel

What is claimed is:

1. An inflatable lighting body, comprising:
an inflatable gas-tight inner sleeve;
an outer sleeve which is translucent at least in some regions and surrounds the inner sleeve;
a longitudinal slot penetrating a top of the outer sleeve between a pair of opposing longitudinal flaps extending from the outer sleeve, the outer sleeve being thereby open at its top over a substantial part of its length, each of the flaps being detached from the outer sleeve along a longitudinal front edge of the flap that is proximal to the longitudinal slot and along two opposing side edges of the flap, the flaps being openable by bending of the flaps about their longitudinal rear junctures with the outer sleeve, said opening of the flaps thereby enlarging a width of the longitudinal slot; and
at least one strap adapted for attachment to the lighting body of a lighting source having a shape and size that do not permit the lighting source to be fully inserted between the outer and inner sleeves, each of the straps being configured to overlap the lighting source with attachment of opposing ends of the strap to the opposing flaps, the lighting source being positioned by the at least one strap proximate one of the transparent or translucent portions of the inner sleeve, thereby enabling the lighting source to irradiate light into an interior of the inner sleeve, said light being emitted into a surrounding environment as a diffuse light via the translucent regions of the outer sleeve.

2. The inflatable lighting body of claim 1, wherein the at least one strap is adaptable to attach any one of an approximately cylindrical lighting source, a planar plate-form lighting source, and a lighting source that is planar on its lower face, to the lighting body.

3. The inflatable lighting body of claim 1, wherein at least a portion of the lighting source can be at least one of:
inserted into the outer sleeve from above in the region of the longitudinal slot;
positioned on the outer sleeve above the longitudinal slot; and
externally positioned on the inner sleeve in the region of the longitudinal slot.

4. The inflatable lighting body of claim 3, characterised in that, a cylindrical lighting tube can be inserted into the longitudinal slot from above.

5. The inflatable lighting body of claim 3, wherein a cylindrical LED lighting tube can be inserted from above into the longitudinal slot of the outer sleeve, and can be positioned onto the inner sleeve.

6. The inflatable lighting body of claim 3, wherein a plate-form lighting means or a lighting unit that is planar on its lower face, can be positioned onto the inner sleeve in the region of the longitudinal slot of the outer sleeve.

7. The inflatable lighting body of claim 1, wherein the at least one strap is a tensioning device that is configured to variably adjust a tensioning length overlapping the lighting source.

8. The inflatable lighting body of claim 7, wherein at least one of the straps is a buckle strap, an elastic strap, or a hook-and-loop tape.

9. The inflatable lighting body of claim 1, wherein the outer sleeve comprises first and second interconnected regions, each made from a textile material, wherein the first interconnected region forms an upper section of the sleeve, and is dark on its outer surface and reflective on its inner surface, while the second interconnected region forms a lower section of the sleeve and is translucent.

10. The inflatable lighting body of claim 1, wherein the lighting source is a lighting tube or a lighting panel.

11. The inflatable lighting body of claim 1, further comprising an attachment mechanism that is configured to mount the lighting body.

12. The inflatable lighting body of claim 11, wherein the attachment mechanism that is configured to mount the lighting body is attached to the lighting source, which is attached to the lighting body.

* * * * *